United States Patent [19]

Gray et al.

[11] 4,234,331
[45] Nov. 18, 1980

[54] COATING METHOD

[75] Inventors: Dorian R. Gray, Nashville, Tenn.; Salvatore Guerra, Melvindale; John H. Meyer, Milford, both of Mich.

[73] Assignee: Ford Motor Company, Dearborn, Mich.

[21] Appl. No.: 43,552

[22] Filed: May 29, 1979

Related U.S. Application Data

[63] Continuation-in-part of Ser. No. 935,036, Aug. 18, 1978, abandoned.

[51] Int. Cl.³ .......................................... C03C 17/00
[52] U.S. Cl. .................... 65/60 R; 65/60 B; 65/60 C; 65/181; 427/168; 427/196
[58] Field of Search ................... 65/60 R, 60 A, 60 B, 65/60 C, 60 D; 118/314; 427/168, 196

[56] References Cited

U.S. PATENT DOCUMENTS

| | | | |
|---|---|---|---|
| 2,505,179 | 4/1950 | Gaythwaite | 118/314 |
| 3,660,061 | 4/1972 | Donley et al. | 65/32 |
| 3,796,184 | 3/1974 | Hawkins | 118/323 |
| 3,841,858 | 10/1974 | Akashi et al. | 65/60 B |
| 4,042,363 | 8/1977 | Maeda et al. | 65/60 R |

*Primary Examiner*—Arthur D. Kellogg
*Attorney, Agent, or Firm*—William E. Johnson; Keith L. Zerschling

[57] ABSTRACT

A method of applying a metallic oxide coating to a moving ribbon of glass is disclosed for four thicknesses of glass, namely, 7/32; 3/16; 5/32 and ⅛ inch. In each of these methods, first and second spray zones are established at opposite edges of the moving ribbon. The spray zones are moved in a simultaneous manner at the same speed from one edge to the other edge whereby the spray zones pass each other at the center line of the moving ribbon. When each of the spray zones reach the opposite edge of the moving ribbon, their direction of travel is reversed so that they once again pass one another at the center line of the moving ribbon. The first and second spray zones are spaced a slight distance from one another in the direction of movement of the moving ribbon. The moving spray zones are cycled back and forth in the aforedescribed manner continuously as the ribbon of material is moved thereunder so that a coating is applied to the moving ribbon. This method is used for applying a metal oxide coating to a moving ribbon of glass which is emerging from a float glass chamber.

4 Claims, 3 Drawing Figures

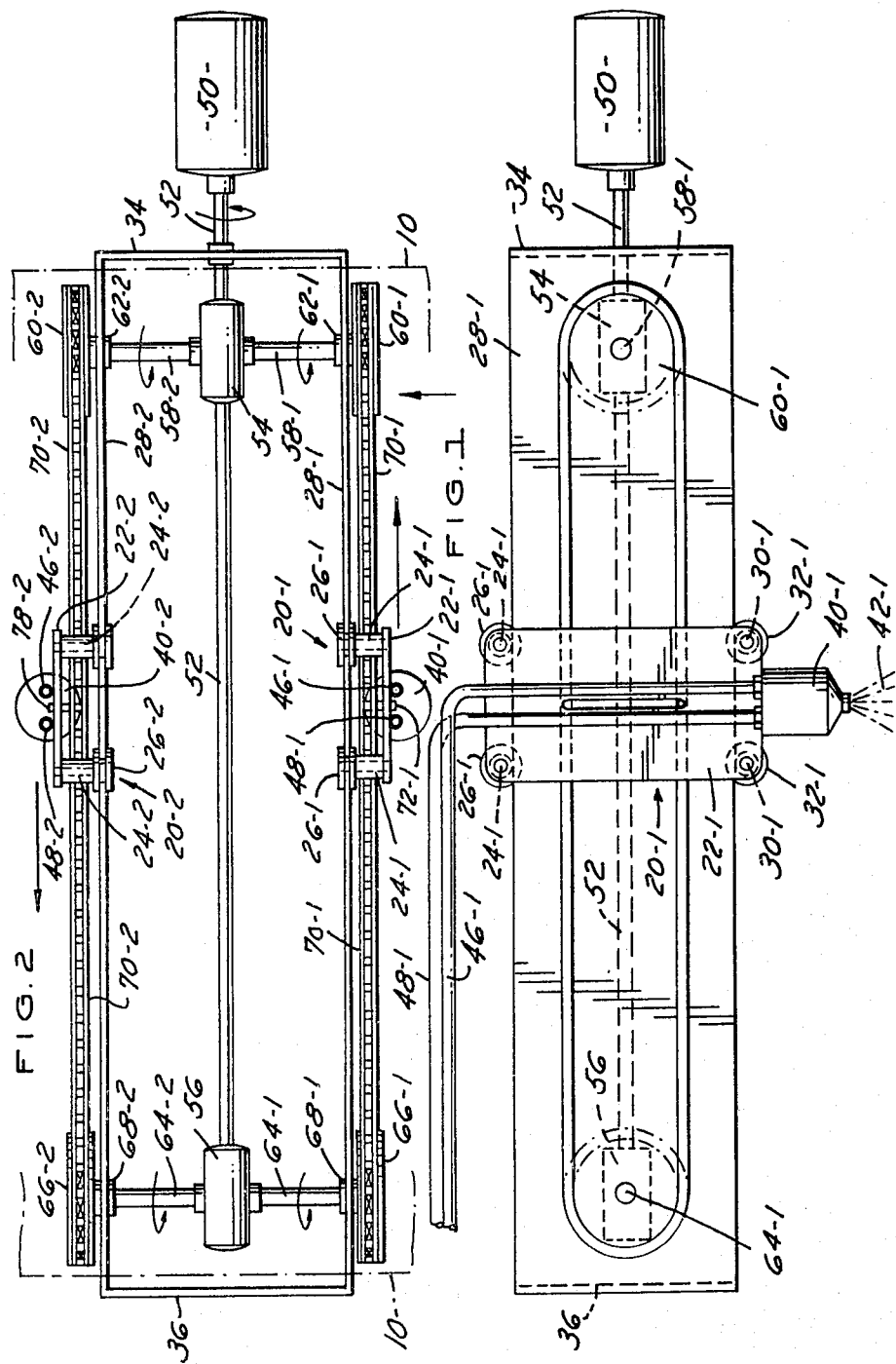

COATING METHOD

This application is a continuation-in-part of our prior application Ser. No. 935,036 filed Aug. 18, 1978 and entitled "Coating Method" now abandoned.

BACKGROUND OF THE INVENTION AND PRIOR ART STATEMENT

The prior art has disclosed many devices for applying a coating to a moving ribbon of material. In particular, the prior art has disclosed many apparatus for applying a metal oxide coating to a moving ribbon of glass, the glass having been manufactured in a float glass furnace. Typical of these showings are the showings of U.S. Pat. Nos. 3,660,061 for a "Coated Glass Sheet and Method of Making the Same"; and 3,796,184 for "Reciprocating Device Having Vibration Reducing Means".

The two cited patents are typical of the structures known in the art in that they show a single spray zone being moved back and forth across a ribbon of glass to be treated. The single spray zone may have one or more spray heads. However, these cited patents typify the many patents which show the use of a single spray zone being moved alternately from right to left and from left to right across a ribbon of hot glass in order to apply materials thereto which disintegrate by heat to form a metallic oxide coating on the glass surface.

It is a primary object of this invention to provide detailed spraying methods which are more efficient in depositing a metallic oxide film on a moving ribbon of glass of varying thickness. A unique method is set forth for each thickness.

SUMMARY OF THE INVENTION

This invention relates to a method of applying a metallic oxide coating to a moving ribbon of glass. A different method is disclosed for each of four thicknesses of glass.

In accordance with the general teachings of the method of this invention, a metal oxide coating is applied to a moving ribbon of glass having a right edge and a left edge in the following manner. A first spray zone is established at the right edge of the moving ribbon. In a similar manner, a second spray zone is established at the left edge of the moving ribbon. The first and second spray zones are spaced from one another a short distance along the direction of travel of the ribbon of material so that the spray zones do not overlap. The first spray zone is moved from the right edge to the left edge of the moving ribbon, while simultaneously therewith the second spray zone is moved from the left edge to the right edge of the moving ribbon at the same speed as the first spray zone is being moved. In this manner, the two spray zones pass one another at the center of the moving ribbon. The direction of movement of the spray zones is reversed when they reach the edges of the ribbon towards which they were being moved. Thereafter, the spray zones are returned to the edge of the ribbon from whence they started at the same speeds so that the zones once again pass one another at the center of the moving ribbon. The motion of the spray zones is repeated as the moving ribbon passes thereunder so that a continuous metallic oxide coating is applied to the moving ribbon of glass.

In accordance with particular teachings of this method, specific conditions are set forth in the specification to obtain the best coatings on four different thicknesses of glass. The specific thicknesses are in inches: 7/32; 3/16; 5/32 and ⅛.

BRIEF DESCRIPTION OF THE DRAWINGS

FIG. 1 is a front elevation view of an apparatus which can carry out the coating method of this invention.

FIG. 2 is a plan view of the apparatus in FIG. 1 showing the portions of that apparatus which establish the first and second spray zones.

DESCRIPTION OF THE PREFERRED EMBODIMENT

Construction

Figure 3:
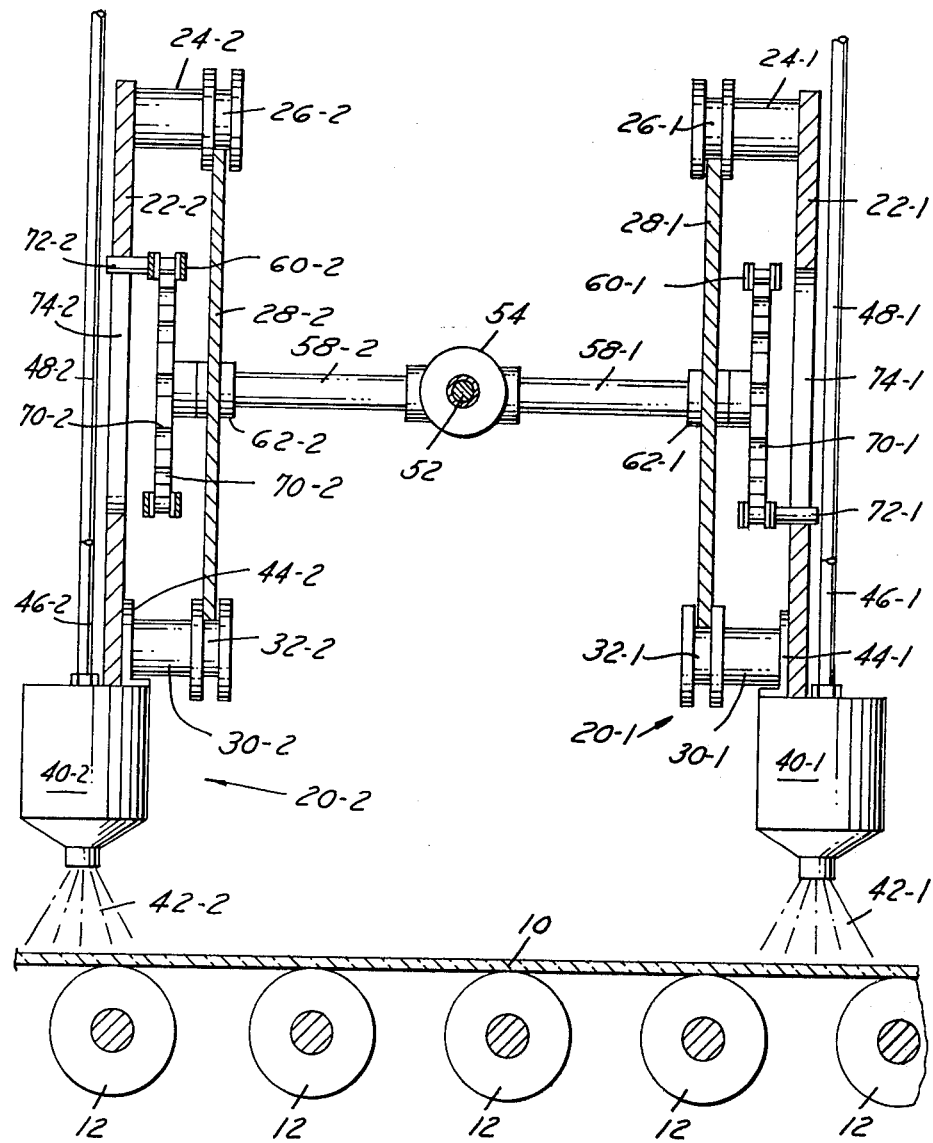
FIG. 3 is a side elevation view, partly in cross section, of the apparatus shown in FIGS. 1 and 2, the Figure showing some of the details for operating that apparatus.

A preferred embodiment of the coating method of this invention will now be discussed. The preferred embodiment will be illustrated as a method of applying a metallic oxide coating to a moving ribbon of glass, that ribbon of glass having just been formed in a float bath chamber. Since the application of such materials to a moving ribbon of recently formed glass is well known in the art, as is evidenced by the disclosures of U.S. Pat. Nos. 3,660,061 and 3,796,184, no detailed discussion of either the formation of the glass ribbon nor the materials which are applied thereto in order to form the oxide coating will be undertaken herein, as they are well known in the art. The prior art also discloses how to withdraw excess spray material from the spray zone by means of exhaust hoods. The method of this invention does not change either the chemicals, the manner of exhausting such chemicals, or the location at which such chemicals are applied to a moving ribbon of glass, but rather the manner in which the chemicals are applied and the inter-relationship of various aspects of spray application for various thicknesses of glass ribbon being coated.

It should also be understood, that the apparatus disclosed in the associated drawings is a preferred apparatus. Many other apparatus may be designed which will accomplish the method of this invention. The description of the particular apparatus disclosed herein is not intended to be taken as any limitation on the method of this invention.

The method of this invention is illustrated as being useful in the application of coating materials to a ribbon of glass 10 which is being supported on a plurality of conveyor rolls 12-12 in a coating station in accordance with fundamentals already known to those skilled in the art. A later part of this specification will describe coating conditions for four separate thicknesses of glass, namely, 7/32; 3/16; 5/32 and ⅛ inch. The change in thickness of the glass ribbon is made by changing the conditions of the float chamber, as is known in the art. The coating materials to be applied to the hot glass ribbon are materials which decompose in the hot environment to produce a metallic oxide coating on the glass ribbon. The specific compositions used for each thickness will be described in a later portion of this specification.

In accordance with the teachings of the method of this invention, the apparatus is provided with two spraying units, generally designated by the numerals 20-1 and 20-2. Since the two units are identical in construction, a description will be given of only the first unit. The second unit will have the similar parts identified by the same numeral with the designation -2 thereafter in order to distinguish it as being associated with the second unit.

The spray unit 20-1 has a main frame member 22-1. This main frame member has a pair of upper wheel support members 24-24-1, respectively supporting grooved upper wheels 26-26-1. These upper wheels are received in and ride along an upper surface of frame member 28-1, which is suitably supported above the glass ribbon by members not shown.

The main frame member 22-1 also carries lower wheel support members 30-30-1, which rotatably carry grooved lower wheels 32-32-1 thereon. These grooved lower wheels are received in and ride along a bottom surface of the frame member 28-1. Frame members 28-1 and 28-2 are interconnected by side frame members 34 and 36.

A spray gun 40-1 for establishing a spray zone 42-1 is secured by a bracket 44-1 to the main frame member 22-1. A supply line 46-1 supplies chemicals to the spray gun 40-1 while a supply line 48-1 supplies compressed air to the spray gun 40-1 in order to generate the spray zone 42-1.

In accordance with the method of this invention, the apparatus disclosed in the drawing is equipped with a drive motor 50, which is used to reciprocate the spray guns 40-1 and 40-2 back and forth across the moving glass ribbon 10. The motor 50 puts out a constant rotational output through shaft 52. This rotational output is delivered to a first gear box 54 and a second gear box 56. The first gear box delivers a rotational output through shafts 58-1 and 58-2 to sprockets 60-1 and 60-2 which are rotatably mounted by suitable rotatable bushings 62-1 and 62-2, respectively, in frame members 28-1 and 28-2.

Similarly, the second gear box 56 has output shafts 64-1 and 64-2 (FIG. 2) which rotatably drive sprockets 66-1 and 66-2 which are mounted from rotatable bushings 68-1 and 68-2 supported, once again, in frame membes 28-1 and 28-2. Chain 70-1 and 70-2 are mounted so as to be respectively guided over sprockets 60-1 and 66-1 on the case of chain 70-1, and sprockets 60-2 and 66-2 in the case of chain 70-2. Chain 70-1 has associated therewith a dog 72-1 (see FIG. 3), while chain 70-2 has associated therewith dog 72-2. The dog 72-1 is received in a slot 74-1 of main frame member 22-1, while the dog 72-2 is received in a slot 74-2 of the main frame member 22-2.

As is noted by inspection of FIG. 3, the dog 72-1 of the spray unit 20-1 is in the lower portion of its associated slot, which causes the entire spray unit to be driven from left to right as viewed in FIG. 2, while the dog 72-2 of the spray unit 20-2 is in the upper portion of its associated slot 74-2 causing that unit 20-2 to be moved from right to left as viewed in FIG. 2. As is well known by those skilled in the art, when the respective spray units reach the end of traversal of the ribbon of glass, the dogs are moved by rotation of their associated sprocket from the lower or upper portion of the slot to the other end of the slot whereby the direction of movement of each unit is reversed and the units are driven in the opposite direction, although the motor 50 continues to drive in a single direction. This type of oscillating motion, generated from a single output of a motor, is well known in the art.

Having set forth the construction to achieve the method of this invention, the method will be described in greater detail. The three drawings should be referred to during the description of the method.

Operation

A method of applying a coating to a moving ribbon of material, such as glass, which ribbon has a right edge and a left edge, is generally in accordance with the following steps. The steps will be described in association with the apparatus shown in the drawings.

A first spray zone 42-2 is established at the right edge of the moving ribbon of glass 10. This may best be understood by envisioning that spray unit 20-2 is on the right hand side of FIG. 2 of the drawings. In this situation, the dog 72-2 associated with chain 70-2 is in the upper portion of slot 74-2 of main frame member 22-2 of the apparatus. In this configuration, the spray unit 20-2 will be moved from right to left, as viewed in FIG. 2. At the same time, the spray unit 20-1 will be located at the left edge of the moving ribbon of glass 10.

As noted best in FIG. 2, the spray units 20-1 and 20-2 are spaced a short distance from one another in the direction of travel of the ribbon of glass. The spray units 20-1 and 20-2 each have associated therewith spray zones 42-1 and 42-2 developed from their associated spray guns 40-1 and 40-2 because of the supply thereto of spray materials and compressed air. When the spray unit 20-1 is positioned at the left edge, as viewed in FIG. 1, the dog 72-1 associated with the chain 70-1 is in the lower part of slot 74-1 associated with the main frame member 22-1.

Rotation of the drive motor 50 and operation of the gear boxes 54 and 56 cause the shafts associated therewith to operate the sprockets 60-1, 60-2, 66-1 and 66-2 in a manner which causes the first spray zone 42-2 to move from the right edge to the left edge of the moving ribbon of glass, while simultaneously therewith the other spray zone 42-1 is moved from the left edge to the right edge of the moving ribbon at the same speed as the spray zone 42-2 is being moved so that the two spray zones pass one another at the center of the moving ribbon, as is graphically depicted in FIGS. 1 and 2.

As is well known to those skilled in the art, the operation of the dog 72 associated with each of the spray units 20 by movement from one location to another location in the slot 74 associated with the main frame member 22, will cause reversal of the direction of movement of the spray zones 42-1 and 42-2 when the spray zones each reach the edge of the ribbon towards which they are being moved. Continued rotation of shaft 52 by drive motor 50 will cause the spray zones to be returned to the position from which they started at the same speed so that the zones, once again, pass one another at the center of the moving ribbon. Continued rotation of the shaft 52 by the drive motor 50 causes repititious movement of the spray zones back and forth across the ribbon in a manner in which they move toward each other, pass each other in the center, and then move away from each other until they reach their terminal positions, at which reversal of movement occurs.

In accordance with the preferred method of this invention, the chemical spray on the hot ribbon of glass are compositions which react with the surface of the glass in order to develop a metallic oxide coating thereon. We have found that the metallic oxide coatings applied by the method of this invention are significantly better than the metallic oxide coatings applied by traversing the surface of the glass with a single unit which moves back and forth. This has been demonstrated to us in tests in which we compared a dual crossing spray zone machine with a single spray zone machine. We found that the dual crossing zone machine was more efficient in that less coating material needed to be sprayed per square foot of glass coated. Because less material was sprayed to get the same coverage, we had less lingering smoke and fumes in the exhaust hoods of the spraying machine. We also found that the finished product had a more uniform coating of material thereon with less banding. The coating from the dual crossing spray zone machine had a better texture and had improved chemical durability as measured by humidity cabinet tests on both annealed and tempered coated glass sheets, $HF-HNO_3$ dip tests on coated annealed and tempered glass sheets and HCL vapor tests on annealed glass sheets.

SPECIFIC EXAMPLES

Example 1

7/32 inch thick glass ribbon

In the situation where 7/32 inch thick glass is being manufactured by the float chamber, we have found the following sets of conditions produce the most acceptable coated glass. The glass passes through the coating station with a temperature in the range of 950° F. to 1150° F. The glass ribbon should be moving at a rate of from 225 to 325 inches per minute. The metal acetylacetonate solution applied has the following metallic composition: cobalt—66.5 to 68.5%; iron—18.5 to 20.5%; and chromium—12 to 14%. These metal acetylacetonates are dissolved in a suitable solvent so as to have a solids content in the range from 5 to 20%. This material is applied in each of the two spray zones at a rate of application in a range from 480 cc/min. to 2790 cc/min. These spray zones 42-1 and 42-2 are moved over the ribbon of glass at a rate of from 5000 to 10,000 inches per minute.

Example 2

3/16 inch thick glass ribbon

In the situation where 3/16 inch thick glass is being manufactured by the float chamber, we have found the following sets of conditions produce the most acceptable coated glass. The glass passes through the coating station with a temperature in the range of 950° F. to 1150° F. The glass ribbon should be moving at a rate of from 250 to 350 inches per minute. The metal acetylacetonate solution applied has the following metallic composition: cobalt—66.5 to 68.5%; iron—18.5 to 20.5%; and chromium—12 to 14%. These metal acetylacetonates are dissolved in a suitable solvent so as to have a solids content in the range from 5 to 20%. This material is applied in each of the two spray zones at a rate of application in a range from 540 cc/min. to 3000 cc/min. These spray zones 42-1 and 42-2 are moved over the ribbon of glass at a rate of from 5000 to 10,000 inches per minute.

Example 3

5/32 inch thick glass ribbon

In the situation where 5/32 inch thick glass is being manufactured by the float chamber, we have found the following sets of conditions produce the most acceptable coated glass. The glass passes through the coating station with a temperature in the range of 950° F. to 1150° F. The glass ribbon should be moving at a rate of from 300 to 400 inches per minute. The metal acetylacetonate solution applied has the following metallic composition: cobalt—67 to 69%; iron—17 to 19%; and chromium—13 to 15%. These metal acetylacetonates are dissolved in a suitable solvent so as to have a solids content in the range from 5 to 20%. This material is applied in each of the two spray zones at a rate of application in a range from 645 cc/min. to 3430 cc/min. These spray zones 42-1 and 42-2 are moved over the ribbon of glass at a rate of from 5000 to 10,000 inches per minute.

Example 4

1/8 inch thick glass ribbon

In the situation where 1/8 inch thick glass is being manufactured by the float chamber, we have found the following sets of conditions produce the most acceptable coated glass. The glass passes through the coating station with a temperature in the range of 950° F. to 1150° F. The glass ribbon should be moving at a rate of from 400 to 500 inches per minute. The metal acetylacetonate solution applied has the following metallic composition: cobalt—67 to 69%; iron—17 to 19%; and chromium—13 to 15%. These metal acetylacetonates are dissolved in a suitable solvent so as to have a solids content in the range from 5 to 20%. This material is applied in each of the two spray zones at a rate of application in a range from 860 cc/min. to 4290 cc/min. These spray zones 42-1 and 42-2 are moved over the ribbon of glass at a rate of from 5000 to 10,000 inches per minute.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of applying a coating to a moving ribbon of glass having a right edge and a left edge, the ribbon of glass having a thickness of about 7/32 inch and being at a temperature in the range of 950° F. to 1150° F., the ribbon of glass moving at a rate of 225 to 325 inches per minute, which method comprises the steps of:
   (a) establishing a first spray zone at the right edge of the moving ribbon;
   (b) establishing a second spray zone at the left edge of the moving ribbon; said first and said second spray zones being spaced from one another a short distance along the direction of travel of the ribbon of material so that there is no overlap of said spray zones, each of said spray zones applying a spray solution of metal acetylacetonates have the following composition: cobalt—66.5 to 68.5%; iron—18.5 to 20.5%; and chromium—12 to 14% dissolved in a suitable solvent with a solids content of 5 to 20%, the rate of application of said spray solution in each of said spray zones being in a range from 480 cc/min. to 2790 cc/min;
   (c) moving said first spray zone from the right edge to the left edge of the moving ribbon while moving said second spray zone from the left edge to the right edge of the moving ribbon as said first spray zone is being moved so that said two spray zones pass one another at a location over the moving ribbon, said spray zones being moved at a rate of 5000 to 10,000 inches per minute;

(d) reversing the direction of movement of said spray zones when they reach the edge of the ribbon towards which they were being moved;

(e) returning said spray zones to the edge of the ribbon at which they started so that said zones once again pass one another at a location over the moving ribbon; and (f) repeating steps (c), (d) and (e) as the ribbon of material is moved so as to apply a coating to the moving ribbon.

2. A method of applying a coating to a moving ribbon of glass having a right edge and a left edge, the ribbon of glass having a thickness of about 3/16 inch and being at a temperature in the range of 950° F. to 1150° F., the ribbon of glass moving at a rate of 250 to 350 inches per minute, which method comprises the steps of:

(a) establishing a first spray zone at the right edge of the moving ribbon;

(b) establishing a second spray zone at the left edge of the moving ribbon; said first and said second spray zones being spaced from one another a short distance along the direction of travel of the ribbon of material so that there is no overlap of said spray zones, each of said spray zones applying a spray solution of metal acetylacetonates having the following composition: cobalt—66.5 to 68.5%; iron—18.5 to 20.5%; and chromium—12 to 14% dissolved in a suitable solvent with a solids content of 5 to 20%, the rate of application of said spray solution in each of said spray zones being in a range from 540 cc/min. to 3000 cc/min;

(c) moving said first spray zone from the right edge to the left edge of the moving ribbon while moving said second spray zone from the left edge to the right edge of the moving ribbon as said first spray zone is being moved so that said two spray zones pass one another at a location over the moving ribbon, said spray zones being moved at a rate of 5000 to 10,000 inches per minute;

(d) reversing the direction of movement of said spray zones when they reach the edge of the ribbon towards which they were being moved;

(e) returning said spray zones to the edge of the ribbon at which they started so that said zones once again pass one another at a location over the moving ribbon; and (f) repeating steps (c), (d) and (e) as the ribbon of material is moved so as to apply a coating to the moving ribbon.

3. A method of applying a coating to a moving ribbon of glass having a right edge and a left edge, the ribbon of glass having a thickness of about 5/32 inch and being at a temperature in the range of 950° F. to 1150° F., the ribbon of glass moving at a rate of 300 to 400 inches per minute, which method comprises the steps of:

(a) establishing a first spray zone at the right edge of the moving ribbon;

(b) establishing a second spray zone at the left edge of the moving ribbon; said first and said second spray zones being spaced from one another a short distance along the direction of travel of the ribbon of material so that there is no overlap of said spray zones, each of said spray zones applying a spray solution of metal acetylacetonates having the following composition: cobalt—67 to 69%; iron—17 to 19%; and chromium—13 to 15% dissolved in a suitable solvent with a solids content of 5 to 20%, the rate of application of said spray solution in each of said spray zones being in a range from 645 cc/min. to 3430 cc/min;

(c) moving said first spray zone from the right edge to the left edge of the moving ribbon while moving said second spray zone from the left edge to the right edge of the moving ribbon as said first spray zone is being moved so that said two spray zones pass one another at a location over the moving ribbon, said spray zones being moved at a rate of 5000 to 10,000 inches per minute;

(d) reversing the direction of movement of said spray zones when they reach the edge of the ribbon towards which they were being moved;

(e) returning said spary zones to the edge of the ribbon at which they started so that said zones once again pass one another at a location over the moving ribbon; and (f) repeating steps (c), (d) and (e) as the ribbon of material is moved so as to apply a coating to the moving ribbon.

4. A method of applying a coating to a moving ribbon of glass having a right edge and a left edge, the ribbon of glass having a thickness of about ¼ inch and being at a temperature in the range of 950° F. to 1150° F., the ribbon of glass moving at a rate of 400 to 500 inches per minute, which method comprises the steps of:

(a) establishing a first spray zone at the right edge of the moving ribbon;

(b) establishing a second spray zone at the left edge of the moving ribbon; said first and said second spray zones being spaced from one another a short distance along the direction of travel of the ribbon of material so that there is no overlap of said spray zones, each of said spray zones applying a spray solution of metal acetylacetonates having the following composition: cobalt—67 to 69%; iron—17 to 19%; and chromium—13 to 15% dissolved in a suitable solvent with a solids content of 5 to 20%, the rate of application of said spray solution in each of said spray zones being in a range from 860 cc/min. to 4290 cc/min;

(c) moving said first spray zone from the right edge to the left edge of the moving ribbon while moving said second spray zone from the left edge to the right edge of the moving ribbon as said first spray zone is being moved so that said two spray zones pass one another at a location over the moving ribbon, said spray zones being moved at a rate of 5000 to 10,000 inches per minute;

(d) reversing the direction of movement of said spray zones when they reach the edge of the ribbon towards which they were being moved;

(e) returning said spray zones to the edge of the ribbon at which they started so that said zones once again pass one another at a location over the moving ribbon; and (f) repeating steps (c), (d) and (e) as the ribbon of material is moved so as to apply a coating to the moving ribbon.

* * * * *